US007722000B2

(12) United States Patent  
Sherburne

(10) Patent No.: US 7,722,000 B2
(45) Date of Patent: May 25, 2010

(54) MOVABLE SUPPORT POST

(76) Inventor: Richard H. Sherburne, 14 New Rd., Milton, NY (US) 12547-5029

( * ) Notice: Subject to any disclaimer, the term of this patent is extended or adjusted under 35 U.S.C. 154(b) by 12 days.

(21) Appl. No.: 12/219,537

(22) Filed: Jul. 23, 2008

(65) Prior Publication Data

US 2009/0278001 A1 Nov. 12, 2009

Related U.S. Application Data

(60) Provisional application No. 61/071,577, filed on May 6, 2008.

(51) Int. Cl.
*A47G 7/00* (2006.01)
*A47G 29/00* (2006.01)
*A47B 96/06* (2006.01)
*A47K 1/00* (2006.01)
*E04G 3/00* (2006.01)
*E04G 5/06* (2006.01)
*F21V 21/00* (2006.01)
*F21V 35/00* (2006.01)
*A01G 9/02* (2006.01)
*A01G 17/10* (2006.01)

(52) U.S. Cl. .................. 248/27.8; 248/156; 248/218.4; 47/66.6; 47/44; 47/47; 211/85.23; 232/17; 232/45

(58) Field of Classification Search .............. 248/146, 248/27.8, 218.4, 156, 219.1–219.3; 47/86, 47/65.6, 66.6, 66.7, 82, 87, 44, 47; D99/29, D99/31–32; 211/85.18, 85.23; 232/17, 45
See application file for complete search history.

(56) References Cited

U.S. PATENT DOCUMENTS

| 4,130,214 | A | * | 12/1978 | Sobson | 220/694 |
| 5,220,740 | A | | 6/1993 | Brault | |
| 5,678,757 | A | * | 10/1997 | Martin | 232/17 |
| 5,760,751 | A | | 6/1998 | Gipson | |
| 5,960,587 | A | * | 10/1999 | Brasseur et al. | 47/86 |
| 6,098,338 | A | * | 8/2000 | Tilton | 47/66.6 |
| 6,170,692 | B1 | * | 1/2001 | Johnston | 220/475 |
| 6,513,284 | B1 | * | 2/2003 | Sandlin | 47/66.6 |
| 6,539,665 | B1 | * | 4/2003 | Llona | 47/65.5 |
| 6,986,496 | B2 | | 1/2006 | Woude | |
| 7,140,581 | B1 | | 11/2006 | White | |
| 7,246,738 | B2 | * | 7/2007 | Jonas | 232/45 |
| 7,290,697 | B1 | * | 11/2007 | Lessard | 232/39 |
| 2002/0005013 | A1 | * | 1/2002 | Taylor | 47/66.6 |
| 2002/0134017 | A1 | * | 9/2002 | Gibbs | 47/86 |
| 2006/0213786 | A1 | * | 9/2006 | Walser | 206/216 |
| 2009/0090051 | A1 | * | 4/2009 | Hogan | 47/66.6 |

\* cited by examiner

*Primary Examiner*—J. Allen Shriver, II
*Assistant Examiner*—Christopher Garft
(74) *Attorney, Agent, or Firm*—Richard C. Litman

(57) ABSTRACT

A movable support post is attached to a vessel, such as a large planter's pot. Two or more fasteners are employed to attach the post to the vessel. The fasteners extend through the post and extend into the interior of the vessel. A ballast material, such as concrete, is disposed in the vessel and encases the bolts therein. The ballast material acts as an anchor to stabilize the vessel and the attached post. A removable lid or tray is positioned at the top of the vessel. The tray or lid can function as a birdbath or flowerpot, adding a decorative adjunct to the structure.

6 Claims, 3 Drawing Sheets

MOVABLE SUPPORT POST

CROSS-REFERENCE TO RELATED APPLICATION

This application claims the benefit of U.S. Provisional Patent Application Ser. No. 61/071,577, filed May 6, 2008.

BACKGROUND OF THE INVENTION

1. Field of the Invention

The present invention generally relates to posts for fences, mailboxes, and the like, and more specifically to a movable support post attached to a vessel, such as a planter pot, that functions as an anchor for the post.

2. Description of the Related Art

Support posts are employed in a variety functions around the home. Such posts may be used to support a bird feeder, a TV dish antenna, a mailbox, fence barriers, etc. Usually the lower end of the support post is buried in the ground and often encased in concrete. This method of installation presumes that the post will be permanently positioned so that movement thereof will require a lot of time and labor intensive effort. In many instances (concrete, stone or asphalt surfaces), it is not feasible to dig a cavity for the post in the area where it is desired to locate the post. Furthermore, it may be aesthetically desirable to periodically move the post to alternative positions. In such instances the art would certainly welcome a post that could be utilized without requiring that a hole is dug in the ground to anchor the post, and that can be moved when desired. Thus, a movable support post solving the aforementioned problems is desired.

SUMMARY OF THE INVENTION

The movable support post of the instant invention comprises a post that is attached to a vessel, such as a large planter's pot. Two or more bolts or similar fasteners are employed to attach the post to the vessel. The bolts extend through the post and extend into the interior of the vessel. A ballast material, such as concrete or the like, is disposed in the vessel and encases the bolts therein. The ballast material acts as an anchor to stabilize the vessel and attached post. A removable lid or tray is positioned at the top of the vessel. The tray or lid can function as a birdbath or flowerpot, adding a decorative adjunct to the structure. As currently contemplated, the post will be fabricated from conventional wood post material, whereas the vessel and removable tray will be fabricated from plastic material. It should be noted, however, that other suitable materials may be employed, if desired.

Accordingly, the invention relates to a movable support post that can be positioned in a stable manner on a planar surface without requiring a hole or the necessity of being bolted to the planar surface. The support post can be readily moved with only a little effort. The post does not touch the earth or planar surface thus minimizing the chances of rotting or rust. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
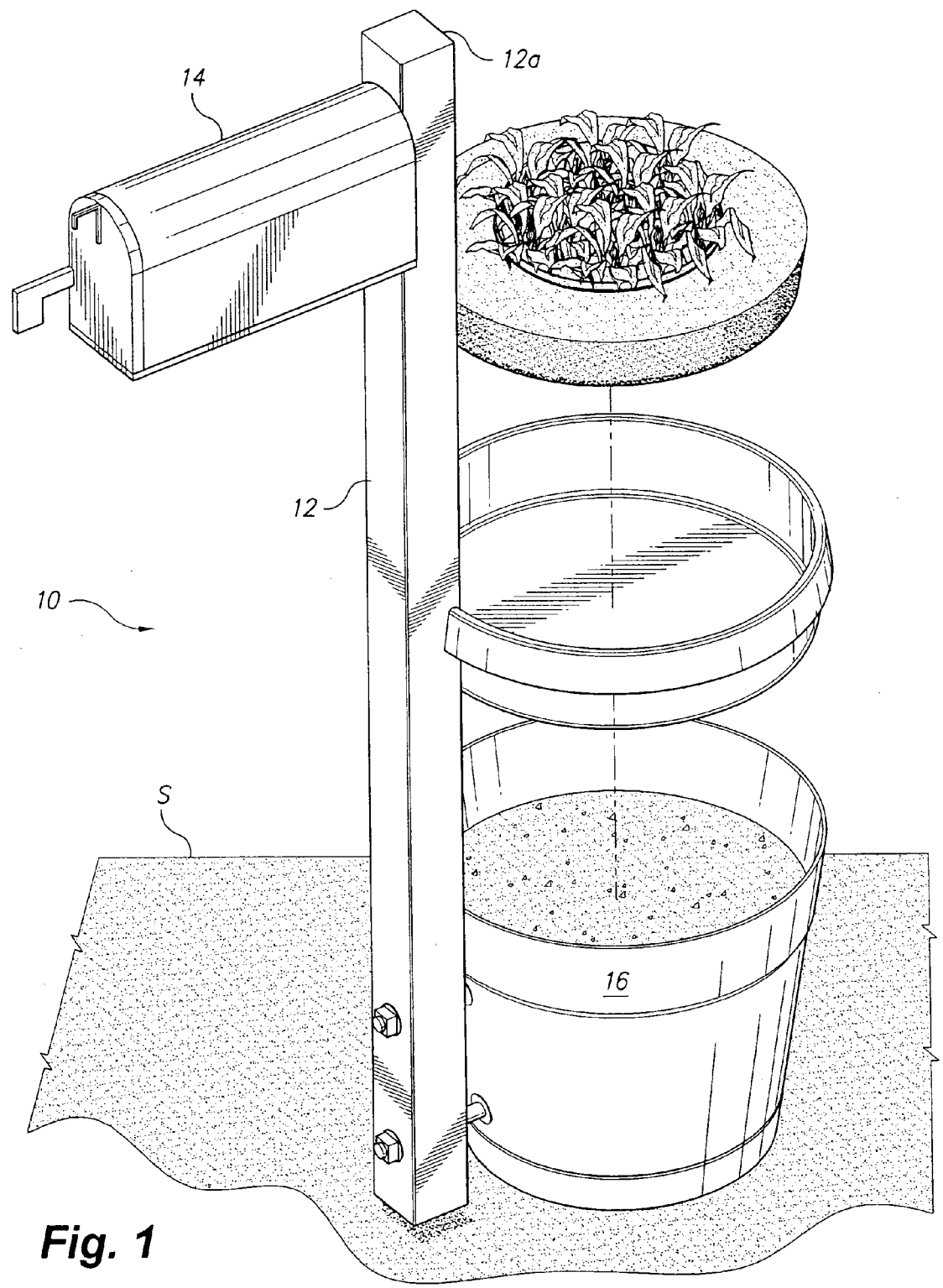
FIG. 1 is an exploded, environmental, perspective view of a movable support post according to the present invention.
Figure 2:
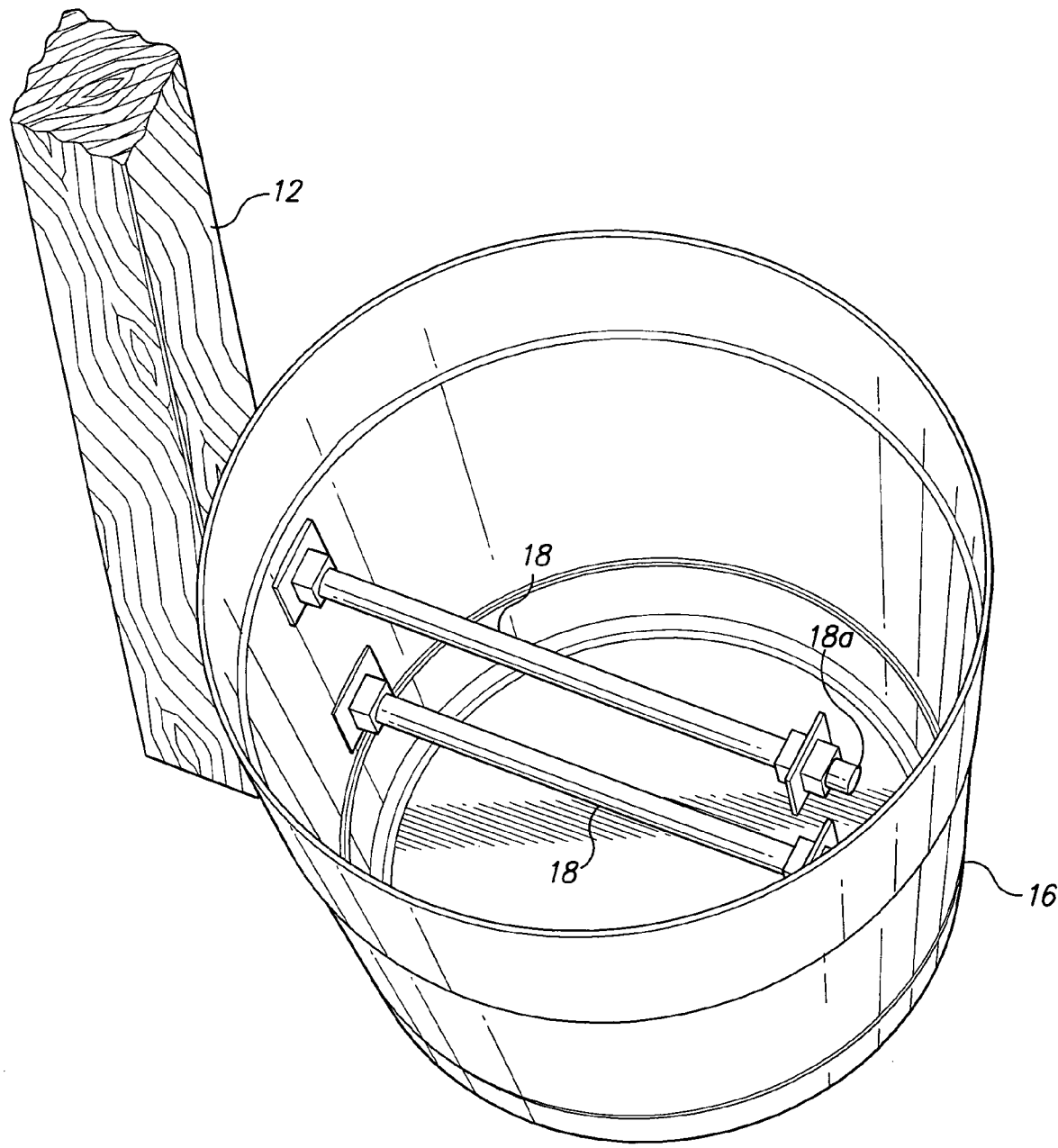
FIG. 2 is a partial, perspective view of a movable support post according to the present invention as seen from the top.
Figure 3:
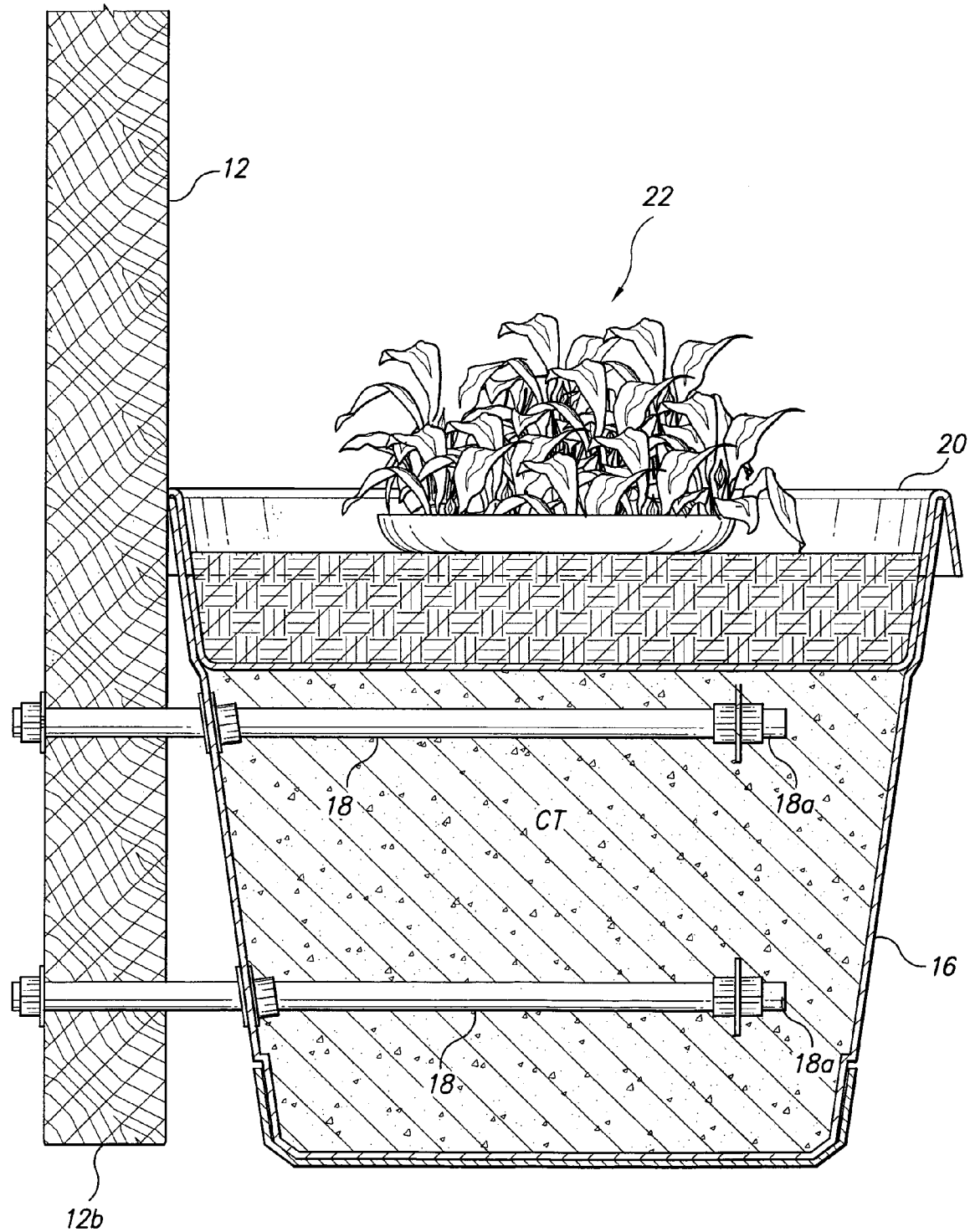
FIG. 3 is a side view in section of a movable support post according to the present invention.

Attention is directed to FIGS. 1-3, wherein the movable support post is generally indicated at 10. The movable support post 10 comprises a post member 12 having an upper end 12a and a lower end 12b. A device to be supported on the post 12 is positioned at upper end 12a. As illustrated, the device is in the form of a mail box 14. As indicated above, the device to be supported could be any of many devices. A large container 16 is attached to the post member 12 adjacent lower end 12b. Plural of bolts 18 are employed to accomplish the attachment. Bolts 18 are of a sufficient length to extend through post 12 and the wall of container 16. Bolts 18 have free ends 18a that terminate in the interior of container 16. Container 16 is filled, almost to its top, with a ballast material, such as concrete CT, to provide stability for the container 16 and attached post 12. A tray 20 is removably supported on the top of container 16. As indicated above, tray 20 can be filled with water to function as a birdbath or utilized to support aesthetically pleasing objects, such as a plant 22, therein. When assembled, lower end 12b will terminate at a point above the bottom of container 16 so that end 12b will not contact planar support surface S.

It is to be understood that the present invention is not limited to the embodiment described above, but encompasses any and all embodiments within the scope of the following claims.

I claim:

1. A movable support post, comprising:
   a container having a wall defining an interior volume and having a bottom surface;
   a post member located along the outside wall of the container and attached to the container, the post member having an upper end and a lower end, the lower end being positioned above the bottom surface;
   a plurality of fasteners attaching the post member to the container, the fasteners having free ends terminating in the interior volume;
   ballast material disposed in the interior volume and encasing the free ends of the fasteners; and
   a removal tray disposed within the container.

2. The movable support post according to claim 1, wherein said ballast material comprises concrete.

3. The movable support post according to claim 1, wherein said fasteners comprise elongated bolts.

4. The movable support post according to claim 1, wherein said post member is fabricated from wood.

5. The movable support post according to claim 1, wherein said container is fabricated from a plastic material.

6. The movable support post according to claim 1, wherein said post member is fabricated from wood and said container and tray are fabricated from a plastic material.

* * * * *